(12) United States Patent
Cheng et al.

(10) Patent No.: US 9,710,518 B2
(45) Date of Patent: Jul. 18, 2017

(54) METHOD AND SYSTEM FOR SEMANTIC SEARCH AGAINST A DOCUMENT COLLECTION

(71) Applicant: LinkedIn Corporation, Mountain View, CA (US)

(72) Inventors: Heyning Cheng, Los Gatos, CA (US); Daniel Tunkelang, Mountain View, CA (US)

(73) Assignee: LinkedIn Corporation, Sunnyvale, CA (US)

(*) Notice: Subject to any disclaimer, the term of this patent is extended or adjusted under 35 U.S.C. 154(b) by 19 days.

(21) Appl. No.: 14/802,466

(22) Filed: Jul. 17, 2015

(65) Prior Publication Data

US 2015/0324431 A1 Nov. 12, 2015

Related U.S. Application Data

(63) Continuation of application No. 13/869,327, filed on Apr. 24, 2013, now Pat. No. 9,116,948, which is a continuation of application No. 13/182,344, filed on Jul. 13, 2011, now Pat. No. 8,473,503.

(51) Int. Cl.
*G06F 17/30* (2006.01)
*G06F 7/00* (2006.01)
*G06Q 50/00* (2012.01)

(52) U.S. Cl.
CPC ........ *G06F 17/30528* (2013.01); *G06F 7/00* (2013.01); *G06F 17/30389* (2013.01); *G06F 17/30401* (2013.01); *G06F 17/30424* (2013.01); *G06F 17/30595* (2013.01); *G06F 17/30867* (2013.01); *G06Q 50/01* (2013.01); *G06F 17/30* (2013.01)

(58) Field of Classification Search
None
See application file for complete search history.

(56) References Cited

U.S. PATENT DOCUMENTS

| | | | |
|---|---|---|---|
| 7,177,798 B2 | 2/2007 | Hsu et al. | |
| 7,809,714 B1* | 10/2010 | Smith | ............... G06F 17/30395 707/705 |
| 7,933,914 B2 | 4/2011 | Ramsey et al. | |
| 8,473,503 B2 | 6/2013 | Cheng et al. | |
| 2006/0020591 A1* | 1/2006 | Kommers | ........... G06F 17/3097 |

(Continued)

OTHER PUBLICATIONS

"U.S. Appl. No. 13/182,344, Non Final Office Action mailed Sep. 12, 2012", 29 pgs.

(Continued)

*Primary Examiner* — Jay Morrison
(74) *Attorney, Agent, or Firm* — Schwegman Lundberg & Woessner, P.A.

(57) ABSTRACT

Disclosed in one example is a method for searching. In some examples, the method includes receiving an unstructured search query, parsing the unstructured search query into a plurality of structured search attributes using a search term attribute dictionary, performing a search of a structured database based upon the plurality of structured search attributes to identify a plurality of search results, populating a plurality of form fields of a search form with the plurality of structured search attributes, and displaying the search form in association with the search results.

20 Claims, 11 Drawing Sheets

(56) References Cited

U.S. PATENT DOCUMENTS

| | | | |
|---|---|---|---|
| 2007/0008321 A1* | 1/2007 | Gallagher | G06F 17/30265 345/473 |
| 2007/0130186 A1 | 6/2007 | Ramsey et al. | |
| 2008/0154824 A1 | 6/2008 | Weir et al. | |
| 2008/0189262 A1 | 8/2008 | Peng et al. | |
| 2009/0019354 A1 | 1/2009 | Jaiswal et al. | |
| 2010/0010977 A1 | 1/2010 | Choi et al. | |
| 2010/0030578 A1 | 2/2010 | Siddique et al. | |
| 2010/0042405 A1 | 2/2010 | Tsuzuki et al. | |
| 2010/0305983 A1 | 12/2010 | De Marcken | |
| 2012/0047159 A1* | 2/2012 | Pickens | G06F 17/30648 707/765 |
| 2012/0239519 A1* | 9/2012 | Wu | G06F 17/30867 705/26.3 |
| 2013/0018900 A1 | 1/2013 | Cheng | |
| 2013/0232171 A1 | 9/2013 | Cheng et al. | |

OTHER PUBLICATIONS

"U.S. Appl. No. 13/182,344, Notice of Allowance mailed Feb. 22, 2013", 5 pgs.

"U.S. Appl. No. 13/182,344, Response filed Feb. 12, 2013 to Non Final Office Action mailed Sep. 12, 2012", 11 pgs.

"U.S. Appl. No. 13/869,327, Examiner Interview Summary mailed Mar. 30, 2015", 3 pgs.

"U.S. Appl. No. 13/869,327, Final Office Action mailed Dec. 30, 2013", 19 pgs.

"U.S. Appl. No. 13/869,327, Non Final Office Action mailed Jan. 23, 2015", 5 pgs.

"U.S. Appl. No. 13/869,327, Non Final Office Action mailed Jun. 26, 2013", 10 pgs.

"U.S. Appl. No. 13/869,327, Non Final Office Action mailed Jun. 26, 2014", 19 pgs.

"U.S. Appl. No. 13/869,327, Notice of Allowance mailed Apr. 21, 2015", 7 pgs.

"U.S. Appl. No. 13/869,327, Response filed Apr. 13, 2015 to Non Final Office Action mailed Jan. 23, 2015", 10 pgs.

"U.S. Appl. No. 13/869,327, Response filed May 29, 2014 to Final Office Action mailed Dec. 30, 2013", 12 pgs.

"U.S. Appl. No. 13/869,327, Response filed Sep. 26, 2014 to Non Final Office Action mailed Jun. 26, 2014", 11 pgs.

"U.S. Appl. No. 13/869,327, Response filed Oct. 28, 2013 to Non Final Office Action mailed Jun. 26, 2013", 10 pgs.

"Dmoz: Open Directory Project home page", [Online]. Retrieved from the Internet: <URL: http://www.dmoz.org/>, (Accessed Oct. 18, 2012), 1 pg.

"Yahoo Directory", [Online]. Retrieved from the Internet: <URL: http://dir.yahoo.com/>, (Accessed Oct. 18, 2012), 1 pg.

Furnas, G. W, "The vocabulary problem in human-system communication", Communications of the ACM, 30(11), (Nov. 1987), 964-971.

Grice, H. P, "Logic and conversation", Syntax and Semantics, vol. 3, Speech Acts, ed. by Peter Cole and Jerry L. Morgan, New York: Academic Press, (1975), 41-58.

Marchionini, G., et al., "Toward a general relation browser: A GUI for information architects", Journal of Digital Information, 4(1), (2003), 17 pgs.

Tunkelang, Daniel, "Dynamic Category Sets: An Approach for Faceted Search", SIGIR '06 Workshop on Faceted Search Conference, (Aug. 10, 2006), 5 pgs.

Yee, Ka-Ping, et al., "Faceted Metadata for Image Search and Browsing", CHI, [Online]. Retrieved from the Internet: <URL: http://flamenco.berkeley.edu/papers/flamenco-chi03.pdf>, (Apr. 5, 2003), 8 pgs.

* cited by examiner

QUERY: ENGINEERING MANAGER GOOGLE NEW YORK

People Search Results | Linkedin

Linked[in]  Go to Linkedin Recruiter >                                      Add Connections Home  Profile  Contacts  Groups  Jobs  Inbox [46]  Companies  News  More  [People▼]          [Q Advanced]

| Find People | Advanced People Search | Reference Search | Saved Searches |                     Profile Organizer Search                    Sort by: Relevance ▼   View: Basic ▼                    21 results   + Save Keywords:                 Jack Hill [2nd]
                          Technical Lead / Engineering Manager at Google
First Name:               Greater New York City Area | Internet In Common: > 2 shared connections
Last Name:
                          Bob Brown [2nd]
                          Technical Lead Manager at Google
Title:                    Greater New York City Area | Information Technology and Services
"engineering manager" OR "chie
                          In Common: > 1 shared connections
[Current          ▼]
Company:                  John Jones [2nd]
"google"                  Software Engineer / Manager at Google
                          Greater New York City Area | Computer Software
[Current          ▼]
                          In Common: > 1 shared connections
School:
                          Mary White [2nd]
                          Engineering Manager at Google
Location:                 Greater New York City Area | Computer Software
[Located in or near: ▼]
Country:                  In Common: > 2 shared connections

[United States    ▼]      George Smith [3rd]
Postal Code:              Engineering Manager at Google
[10021]  Lookup           Greater New York City Area | Internet
Within:
                          In Common: > 2 shared connections
[50 mi (80 km)    ▼]
                          Test Engineering Manager at Google
☐ Keep filter selections  Greater New York City Area | Internet

[ Search ]  Show less...

FIG. 6

METHOD AND SYSTEM FOR SEMANTIC SEARCH AGAINST A DOCUMENT COLLECTION

RELATED APPLICATIONS

This application is a Continuation of U.S. patent application Ser. No. 13/869,327, filed on Apr. 24, 2013, which is a Continuation of U.S. patent application Ser. No. 13/182,334, filed on Jul. 13, 2011, which applications are incorporated herein by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2011, LinkedIn, Co. All Rights Reserved.

BACKGROUND

Many social networking sites as well as job searching and other sites rely on structured databases. These databases store member profiles, job listings, job candidate information, and the like. Other users wishing to view certain members, candidates, job positions, or the like must search for the information in this structured database.

Overview

Methods for searching are disclosed herein. Consistent with some examples, the method includes receiving an unstructured search query, parsing the unstructured search query into a plurality of structured search attributes using a search term attribute dictionary, performing a search of a structured database based upon the plurality of structured search attributes to identify a plurality of search results, populating a plurality of form fields of a search form with the plurality of structured search attributes, and displaying the search form in association with the search results.

Consistent with other examples, the method includes receiving an unstructured search query, parsing the unstructured search query into a plurality of structured search attributes using a search term attribute dictionary, the search term attribute dictionary created based upon a plurality of user provided data, expanding at least one of the plurality of structured search attributes by adding one or more related search terms, performing a search of a structured database based upon the plurality of structured search attributes to identify a plurality of search results, and displaying the search results.

Systems for searching are disclosed herein. Consistent with some examples the system includes an input module configured to receive an unstructured search query, a parse module configured to parse the unstructured search query into a plurality of structured search attributes using a search term attribute dictionary, a search module configured to perform a search of a structured database based upon the plurality of structured search attributes to identify a plurality of search results, an output module configured to populate a plurality of form fields of a search form with the plurality of structured search attributes, and configured to display the search form in association with the search results.

Consistent with another example, the system includes an input module configured to receive an unstructured search query, a parse module configured to parse the unstructured search query into a plurality of structured search attributes using a search term attribute dictionary, the search term attribute dictionary created based upon a plurality of user provided data, an expansion module configured to expand at least one of the plurality of structured search attributes by adding one or more related search terms, a search module configured to perform a search of a structured database based upon the plurality of structured search attributes to identify a plurality of search results, and an output module configured to display the search results.

Machine readable storage mediums are disclosed herein that store instructions which when performed by a machine, cause the machine to perform certain operations. Consistent with some examples the operations may include receiving an unstructured search query, parsing the unstructured search query into a plurality of structured search attributes using a search term attribute dictionary, performing a search of a structured database based upon the plurality of structured search attributes to identify a plurality of search results, populating a plurality of form fields of a search form with the plurality of structured search attributes, and displaying the search form in association with the search results.

Consistent with other examples, the operations include receiving an unstructured search query, parsing the unstructured search query into a plurality of structured search attributes using a search term attribute dictionary, the search term attribute dictionary created based upon a plurality of user provided data, expanding at least one of the plurality of structured search attributes by adding one or more related search terms, performing a search of a structured database based upon the plurality of structured search attributes to identify a plurality of search results, displaying the search results.

These examples may be combined in various permutations or combinations. This overview is intended to provide an overview of subject matter of the present patent application, and is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 6 shows a screenshot according to one example of the present disclosure.

DETAILED DESCRIPTION

Figure 1A:
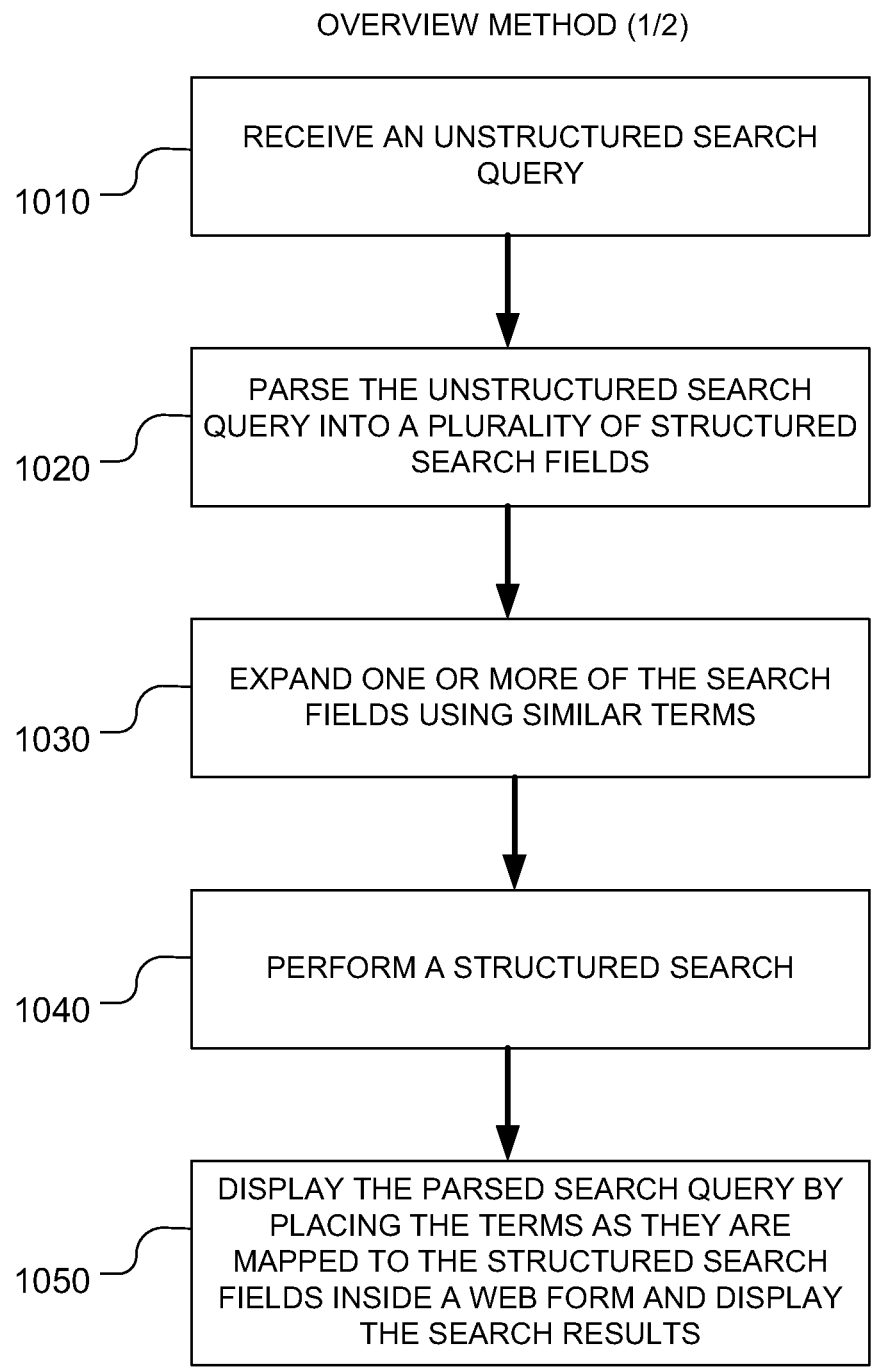
FIG. 1a shows a flowchart according to one example method of the present disclosure.

In the following, a detailed description of some example embodiments of the inventive subject matter will be given with references to the drawings. It should be understood that various modifications to these examples may be made. In particular, elements of one example may be combined and used in other examples to form new examples.

One way to allow users to search an online structured database is to present the user with an advanced search form. The advanced search form presents the user with a list of searchable fields (name, job title, location, and the like) that may correspond to the fields in the structured database and blank boxes to allow a user to enter search terms corresponding to one or more of those particular fields. The system in some examples may only search that particular field in the database (e.g., name) for that particular entered search term (e.g., "Jones"). Other fields that do not directly map to particular fields in the structured database may also be used, including keyword fields. In some examples a keyword field may be used to search across some or all of the searchable fields. These form field searches often are expensive in terms of screen real estate and are time consuming for the average user who must determine which form field to use and to determine which search term to use for that form field.

Another search method may be to employ keyword searching where a user enters a keyword into a single text box. The system then searches some or all of the relevant fields in the database and returns any matching result. This may lead to a high number of returned search results with little or no relevance. For example, a search for the term "Baker" on a social networking service might return all profiles of members who are bakers by profession, but also will likely return all profiles of members who are named "Baker".

Both search formats are susceptible to users misspelling search terms or omitting common synonyms for their search terms, such as nicknames, company name abbreviations, and similar job titles. These omissions or errors may impact search results. For example, the user may only enter software engineer and not computer programmer in an occupation or job title field which may impact the number and quality of results obtained.

Another example search methodology may be to provide the user with a choice of the advanced or the keyword searching forms. This allows a user to search simply for a keyword, or to do a more detailed search based upon a user's preference. This method however fails to address the drawbacks of either search method, instead, leaving the user to choose between the pros and cons of the various searching methods.

Disclosed in one example is a method, system, and machine readable medium which allows a user of a network service which utilizes a structured database (such as a social networking service) to enter a search query into a single box as a search string. The search string may then be automatically parsed into the appropriate advanced search form fields. Then, one or more of the search form fields may be automatically expanded to include similar search terms to capture similar terms. Finally, a search may be run based on the parsed and expanded search form fields. This search may then be presented to the user, along with the results of the expansion and parsing operations to allow the user to edit the choices made by the system. This search method eases search entry and provides improved results by appropriately classifying the various pieces of the search query into the appropriate search form fields and ensures that related phrases and common synonyms are also included in the search.

In some examples a network service may be any service capable of storing and retrieving data of or about a user, product, or service, and presenting the user or other users with that data across a network. In some examples the network service may display this data as part of a web page or other interactive or static display. In some examples, the network service may be a social networking service, a job posting service, a classified posting service, an online retailer, or the like. Examples include LinkedIn®, of Mountain View, Calif. Monster.com®, of Maynard, Mass., Craigslist®, of San Francisco, Calif., or Amazon.com® of Seattle, Wash.

Figure 1B:
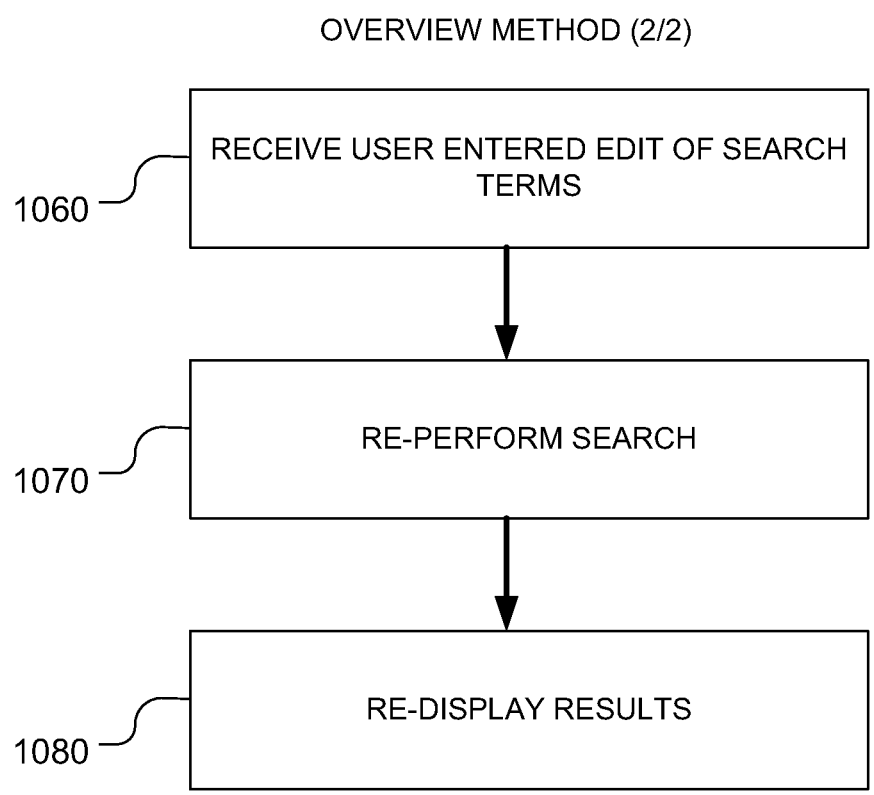
FIG. 1b shows a flowchart of a method according to one example of the present disclosure.

FIG. 1*a* and FIG. 1*b* show one example search method consistent with some embodiments of the invention. At operation 1010 the user may enter an unstructured search query. The unstructured search query may be any string of characters that the user enters. This query may then be parsed into one or more structured search attributes (or fields) at operation 1020. One or more of these structured search fields may be expanded at operation 1030 to add similar search terms. For example, if the search term entered was "computer programmer," and the system parsed that into an occupation search field, then other possible occupation related search terms may be added (e.g., "software engineer") to the occupation search field. At operation 1040, the expanded structured search fields may be used to search the structured database. The results may then be displayed in operation 1050 along with the results of the parsing and expansion operations. The results may be properly displayed in their respective search form fields. Thus for example if the search query was "Jim software engineer," and the system parsed "Jim" as a name and "software engineer" as an occupation, the system may present an advanced search form with a name search box with "Jim" filled in along with any expansions of "Jim," (e.g., "James"), as well as an occupation search box with "software engineer" filled in along with any expansions. Continuing with FIG. 1*b*, the user may then edit the parses and expansions at operation 1060 and then re-perform the search at operation 1070 using the user entered edits. The new results may be displayed at operation 1080.

The problem of parsing the raw search string into one or more structured search attributes may be broken up into at least two constituent parts. The first part involves determining which words in the search string refer to a single search field. Thus for example, if the raw search string is "software engineer," the first part determines whether the terms should be split into "software," and "engineer," or should be kept "software engineer." The second part is determining which search form fields each word or phrase belongs to.

In some examples, the search query may be split up into constituent phrases based on tokenizing the search query using one or more predefined separators. If one of the predefined separators is a " " (space) character, the phrase "software engineer" may be split into "software," and "engineer." These constituent phrases may then be evaluated to determine which phrases correspond to which search fields based upon algorithms for computing probabilities using member or other stored data and past search histories. Several such algorithms are disclosed later.

In other examples, the system may determine both the proper form field and the proper parsing of the constituent phrases simultaneously by considering all the possible phrase combinations and determining the probability of each particular phrase occurring as one of the search fields. The combination of phrases with the highest overall probability score may then be used. In some examples, this may be done by constructing a graph based upon the entered search string and using a path finding algorithm. In these examples, the system dynamically determines the correct parsing of the search query based on likely categorizations of the subphrases of the search query.

Figure 2:
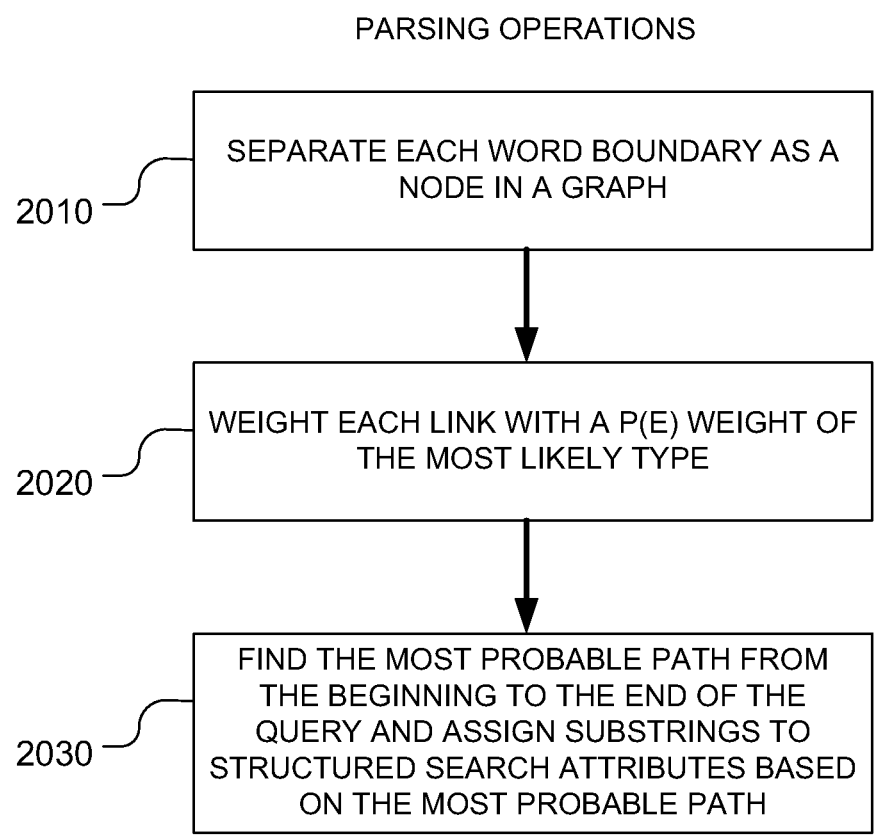
FIG. 2 shows a flowchart of a parsing method according to one example of the present disclosure.
Figure 3:
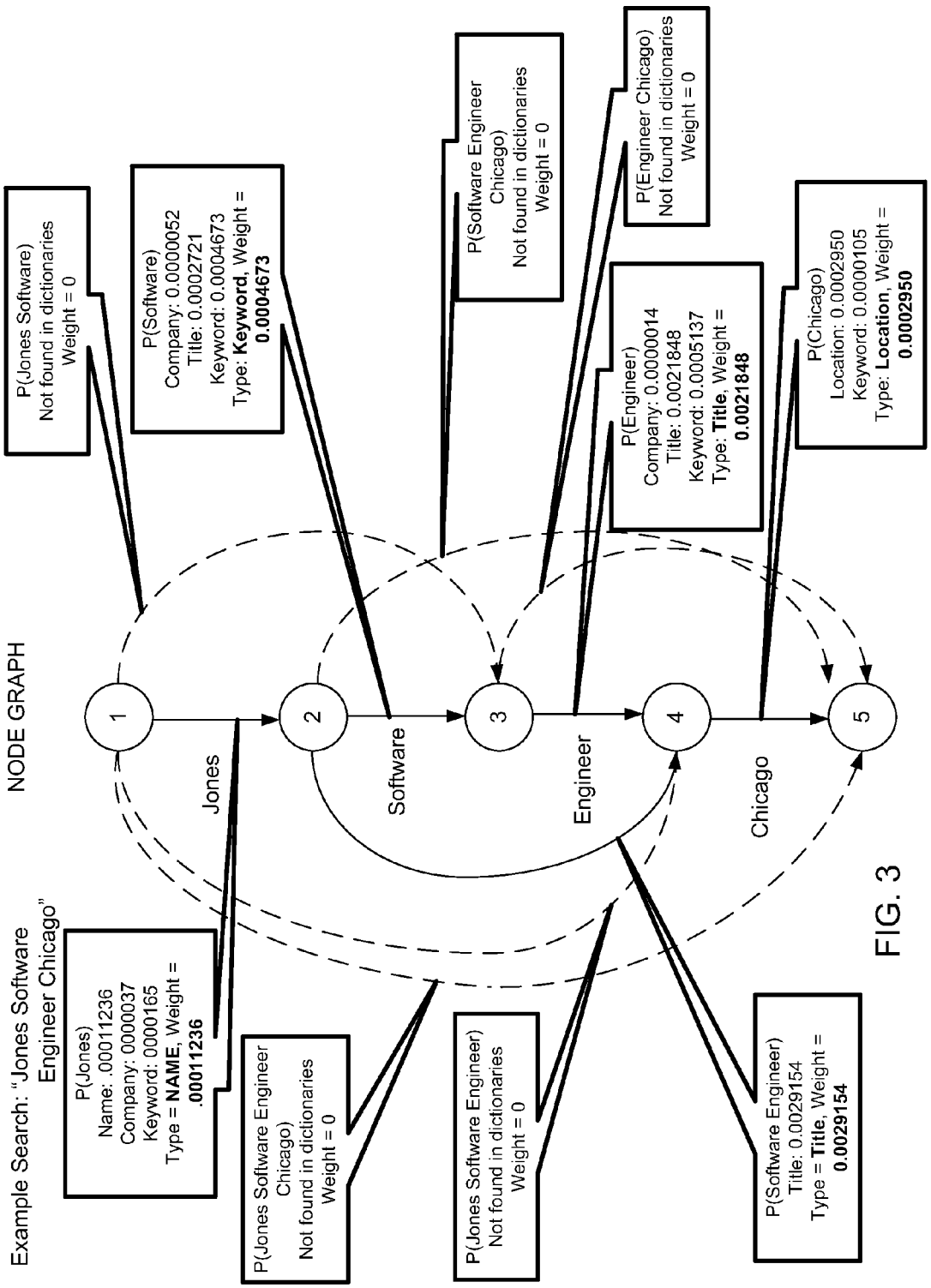
FIG. 3 shows a node graph according to one example of the present disclosure.

Turning now to FIG. 2, an example method of determining both the proper form field and the proper parsing is shown. At operation 2010 each word boundary of the unstructured search may be modeled as a node in a weighted directed acyclic graph. FIG. 3 shows one example where the unstructured search is "Jones Software Engineer Chicago." In this example, five nodes are constructed —one for each boundary between each word. Node one represents the boundary between the beginning of the search string, or " ", and "Jones," whereas node two represents the boundary between "Jones," and "Software," and so on. Each particular node may be connected by a directed edge to one or more other nodes representing word boundaries occurring after that particular node. Thus for example, node one, which represents the boundary between the beginning of the search string and "Jones," may be connected to all the other nodes (that is, nodes two, three, four, and five). Node three, which represents the boundary between "Software," and "Engineer," is only connected to nodes four, and five. Once this graph is built, each path from the beginning to the end of the search string represents a possible parsing of the search string. For example, the path consisting of nodes one to four to five would be parsed as "Jones Software Engineer," "Chicago." The path consisting of nodes one, two, four, five consists of the parse "Jones," "Software Engineer," "Chicago." This method thus takes into account that phrases comprising multiple words may be the intended search term (e.g. "software engineer") as opposed to splitting the search term up based upon word boundaries or other arbitrary tokenizations.

Turning back to FIG. 2, at operation 2020 each directed edge may then be assigned a weight. The weight of each edge in the graph is the greatest of zero or more attribute type weights each associated with a particular attribute type (e.g. name, title, company). The attribute type weight for a particular edge and a particular attribute type represents the probability that a randomly selected search query will contain an entity of that attribute type (e.g., title) having the same text (e.g., "software engineer") as the phrase represented by the edge. This probability is computed as $P(E)=P(E|T)*P(T)$, where $P(T)$ is the prior probability that a randomly selected search query will contain a structured attribute of type T, and $P(E|T)$ is the probability that a randomly selected attribute of type T will have value E. For example, if 50% of search queries contain a title, and 2% of search queries containing a title contain the title "software engineer", then $P(T)=0.5$, $P(E|T)=0.02$, and thus $P(E)=0.5*0.02=0.01$. In some examples, the prior probabilities $P(T)$ may be based upon a manual review of a sample of prior search queries. In other examples, the prior probabilities may be generated based on the frequency of each structured attribute type in a plurality of observed structured searches. In some examples the conditional probability $P(E|T)$ may be based upon one or more pre-computed semantic search field dictionaries. These semantic dictionaries may be based upon information regarding the frequency of particular phrases in data stored in the structured database (e.g. member profiles), frequency information from previous searches, a combination of frequency of phrases in data stored in the structured database and previous searches, or the like. In some examples, each search field may have a custom dictionary to determine the probability that a particular search phrase is a valid term for the search field. Some example dictionaries are presented below.

For example, a person names dictionary may comprise known names of individuals and their frequencies. In some examples, the frequencies may be based upon the number of matching names in the structured database. For example, in the context of a social networking service, the frequency may be based on the number of members of a social networking service who have that particular name. In some examples, this may be expressed as a fraction of members with each name (e.g. the number of members with the name divided by the total number of members). In the case of a person's name, the probability of a two token name (e.g., that the token is both a first and last name) may be computed as $\max(P(\text{First Last}), P(\text{First})*P(\text{Last}))$. For cases in which either the first or last name is not in the person names semantic dictionary, the probability of that first or last name is assumed to be low but not zero (e.g. 0.0000001) in order to enable extraction of names containing a rare token. In other examples, the frequencies may be based upon the frequency of names of job applicants, or the like.

A company names dictionary may comprise known company names and their frequencies. In some examples, the frequencies may be based upon the number of matching company names in the structured database. For example, in the context of the social networking service, the frequency may be based on the number of members of a social networking service who report that they work for that company. In some examples, the frequency may be the fraction of members who report that they work for that company. In other examples the frequency may be based on the frequency of appearance of the company name in previous user submitted advanced searches. In some examples, the frequency may be defined as the fraction of such entries across all advanced searches, or, the frequency may be defined as the fraction of such entries across all advanced searches in which a company name was entered. In yet other examples, the frequency may be defined to be the maximum of the number of members and the frequency of appearance in an advanced search. In other examples, the frequency information may be based upon companies listed in online job postings, or frequency of appearance in employment histories in online resumes, or the like.

A job titles dictionary may comprise known job titles and their frequencies. The frequencies may be based upon the number of matching titles in the structured database. For example, in the social networking context, the frequency may be based upon the number of members of a social networking service who report that particular job title as their job title. In some examples, the frequency may be the fraction of current members who report that particular job title as their job title. In other examples the frequency may be based on the frequency of appearance of that particular job title in previous user submitted advanced searches. In some examples, the frequency may be defined as the fraction of such entries across all advanced searches, or, the frequency may be defined as the fraction of such entries across all advanced searches in which a job title was entered. In yet other examples, the frequency may be defined to be the maximum of the number of members and the frequency of appearance in an advanced search. In other examples, the job titles may be based upon the frequency of appearance of the job title in online job postings, or in resumes posted online by individuals seeking jobs, or the like.

A locations dictionary may comprise known locations and their frequencies. The frequencies may be based upon the number of matching locations in the structured database. For example, in the social networking context, the frequency may be based on the number of members of a social networking service who report that they live or work (or both) in that location, or who are mapped to that location by the social networking service. In some examples, the frequency may be the fraction of current members who report that they live or work in that location. In other examples, the frequency may be based upon locations of jobs in job postings, locations given in resumes posted online by individuals seeking jobs, or the like.

A keywords dictionary may also be determined. The keywords dictionary may comprise common keywords which do not fit in any structured search field. The frequency may be based on keywords entered by users in the keyword field of past structured searches in which an attribute specific search field was also entered (e.g. cases in which the user enters a name in the name field and some other keyword in the keyword field). In some examples the frequency may be based upon the number of times the keyword was used in past searches. In other examples, the frequency may be based upon the fraction of all words in such queries. The frequency could also be based on the number of times the keyword occurs in other corpora.

Other dictionaries may be constructed in which frequencies are calculated based upon information stored or collected by the network service. In some examples, the frequency data may include any user entered data, including member profile information, member resume information, past search data, postings, social interactions, product data, and the like.

The search phrase attribute probabilities are calculated for each edge in the graph (which corresponds to a particular phrasing of the search string) and for each possible search term field. Once this is done, the weight of each link in the graph may then be selected. In some examples, the search field with the highest probability is selected and used as the edge weight. For example, turning back to FIG. 3, the probabilities that the various phrases correspond to one of the search fields is shown. If the term is not found in one of the semantic dictionaries, the system may assign a weight of zero to the link. In FIG. 3 links with a zero weight are shown as a dotted line. For example, the term "Jones Software Engineer Chicago," was not found in any dictionary, and thus the link between node one and node five is assigned a weight of zero and is shown with a dotted line. On the other hand, the search term "Software," had a probability of being a company name of 0.00000052 and a probability of being a title of 0.0002721 and a probability of being a keyword of 0.0004673. The highest probability is that of a keyword at 0.0004673. This is the weight assigned to the link between node two and node three.

Turning back to FIG. 2, once all the weights are calculated and assigned, in operation 2030, an algorithm is run on the graph to find the most probable path from the beginning to the end of the search query. In some examples, this may be a dynamic programming algorithm such as longest path finding algorithms, shortest path finding algorithms, and the like. One example algorithm traverses the given graph in layers of ascending distance from a source vertex. For each vertex, a path of maximum length to that vertex consists of the path of maximum distance through all the layers which are closer to the source than that vertex and the edge of maximum length connecting the longest path with that vertex. Other dynamic programming algorithms may be used, including Dijkstra's algorithm, and the like.

In one example, each edge weight of the graph may represent the maximum attribute type weight corresponding to that particular edge as described previously. The weight of a path traversing a sequence of edges is computed as the product of the weights of those edges, and the weight of the optimal path (i.e. the path with the greatest weight) from the first node in the graph to the last node represents the probability of the most likely plurality of structured attributes. Alternatively and equivalently, a graph can be defined in which each edge weight represents the logarithm of the maximum attribute type weight corresponding to that particular edge, the weight of a path traversing a sequence of edges is computed as the sum of the weights of those edges, and the weight of the optimal path from the first node in the graph to the last node represents the logarithm of the probability of the most likely plurality of structured attributes.

For example, in FIG. 3, we may start by defining a distance array for each node. D[ ]={0,0,0,0,0}. At node one, the distance to node two is 0.00011236 so we set D[ ]={0,.00011236,0,0,0}. The distance to node three based on the edge from node one to node three is zero, the distance to node four based on the edge from node one to node four is zero, and the distance to node five based on the edge from node one to node five is zero. Because the distance in the vector D[ ] is already zero for these paths, D[ ] is not updated.

Continuing with node two, the weight of the edge to node three from node two is 0.0004673, so the path to node three from node one via node two is 0.0004673*0.00011236 (the cost to get to node two)=0.0000000525, so D[ ]={0, .00011236,.0000000525,0,0}. The path between node one and node four has a weight of 0.0029154. Since 0.0029154*.00011236 is greater than zero (the current path weight stored in D[ ] between node one and node four), D[ ] becomes {0,.00011236,.0000000525,.0000003276,0}. Additionally, since the weight of the edge between node three and node five is zero, D[ ] is not updated since the path to node five is still zero.

Continuing with node three, the weight of the edge to node four is 0.0021848 and the cost to node three (D[3])=0.0000000525, thus the cost to node four from node 1 through node three is 0.0000000001147, which is less than currently stored in D[4] (0.0000003276) so D[4] is not updated. Additionally, the weight of the edge between node three and node five is zero so nothing is updated for node five.

Continuing with node four, the weight of the edge between node four and node five is 0.0002950, and the cost of getting to node four is 0.0000003276, so the total longest path is 0.00000000009664. D[ ] becomes {0,.00011-236,.0000000525,.0000003276,.00000000009664}.

Therefore, the maximum weight path is from node one to node two to node four to node five, which results in the parse of "Jones," "Software Engineer," "Chicago," with "Jones" being a name, "Software Engineer" being a job title, and "Chicago" being a location.

Figure 4A:
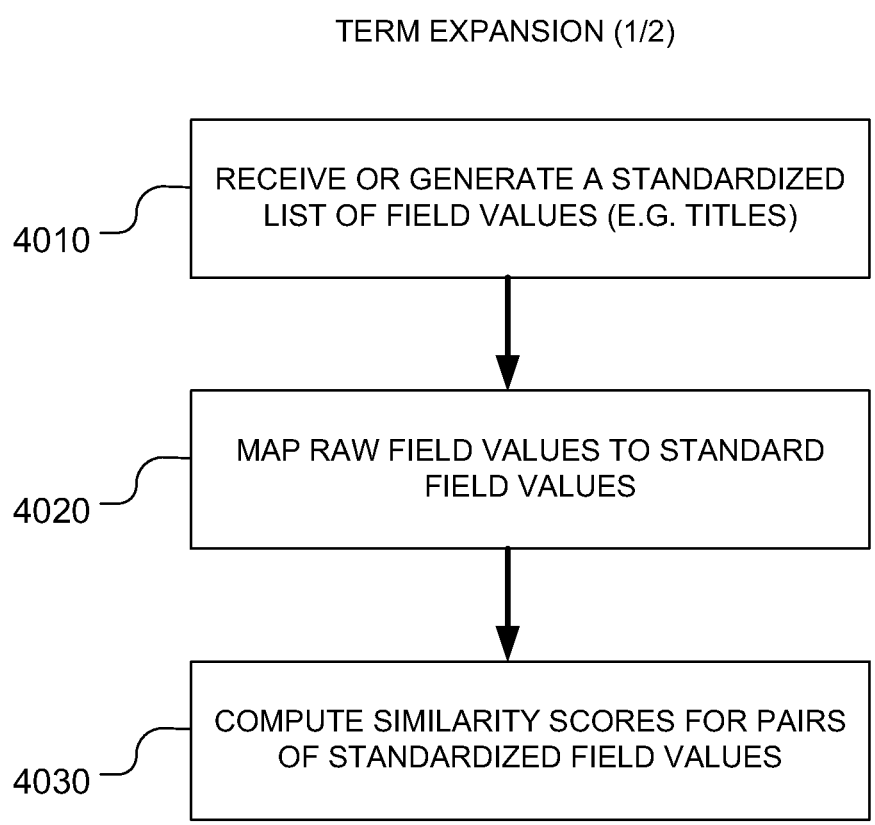
FIG. 4a shows a flowchart of an expansion method according to one example of the present disclosure.

Returning now to FIG. 1, at operation 1030 these search fields may then be expanded to include additional terms and phrases. One method of term expansion is shown in FIG. 4a. At operation 4010, a standardized list of field values (such as titles) is either generated, or received by the system. These standardized lists comprise for example, standard job titles, standard person names, standard company names, standard locations, and the like.

In some examples, at operation 4020, various raw field values may then be mapped to the various standard field values. For example, the raw job title "Computer Programmer," may be mapped to the standard title "Software Engineer." Other examples include mapping a nickname to a standard name, such as "Chuck" to "Charles," mapping subsidiaries of companies to parent companies, and the like. Raw titles may include abbreviations and other common phrasings of the same job title. For example, the raw title "CEO" may be mapped to the standard title "Chief Executive Officer." This mapping in some examples may be done manually. In other examples, this mapping may be done automatically by using various text similarity algorithms, controlled domain vocabularies, word or phrase translations, and external data sources.

Once the raw fields are mapped to the standard fields, similarity scores between pairs of standard titles may be computed at operation 4030. In some examples, the similarity score may be based upon the cosine similarity of term frequency inverse document frequency ("TFIDF") weighted term vectors. This term vector may be constructed based upon the raw field values and/or member profile data (e.g. textual position descriptions) of all members of the social networking service that map to that standard field value.

In other examples, the similarity scores may not be computed, but instead submitted manually. For example, the similarity scores may be generated by individuals or groups of individuals, such as by crowdsourcing. Crowdsourcing is the act of outsourcing tasks to an undefined, large group of people or community through an open call. In one example implementation of crowdsourcing, a problem or task is broadcast to a group of individuals looking for tasks. Those with an interest in solving the problem decide to accept the task. Once a solution is found, the solution is passed to the party who posed the problem or task. Usually, a small payment is then provided to the party who solved the problem by the party who posed the problem. One example crowdsourcing implementation is Mechanical Turk™ run by Amazon.com, Inc. of Seattle, Wash., in which Amazon provides a marketplace in which businesses post tasks that need completion and offer a reward for completing the task. The reward may be any monetary value, but generally is a small reward of a few pennies per task. Individuals looking for tasks then may accept and complete those tasks to gain the reward. The crowdsourcing job may ask users to match similar terms, rank a pair of terms on how similar they are, or the like.

Figure 4B:
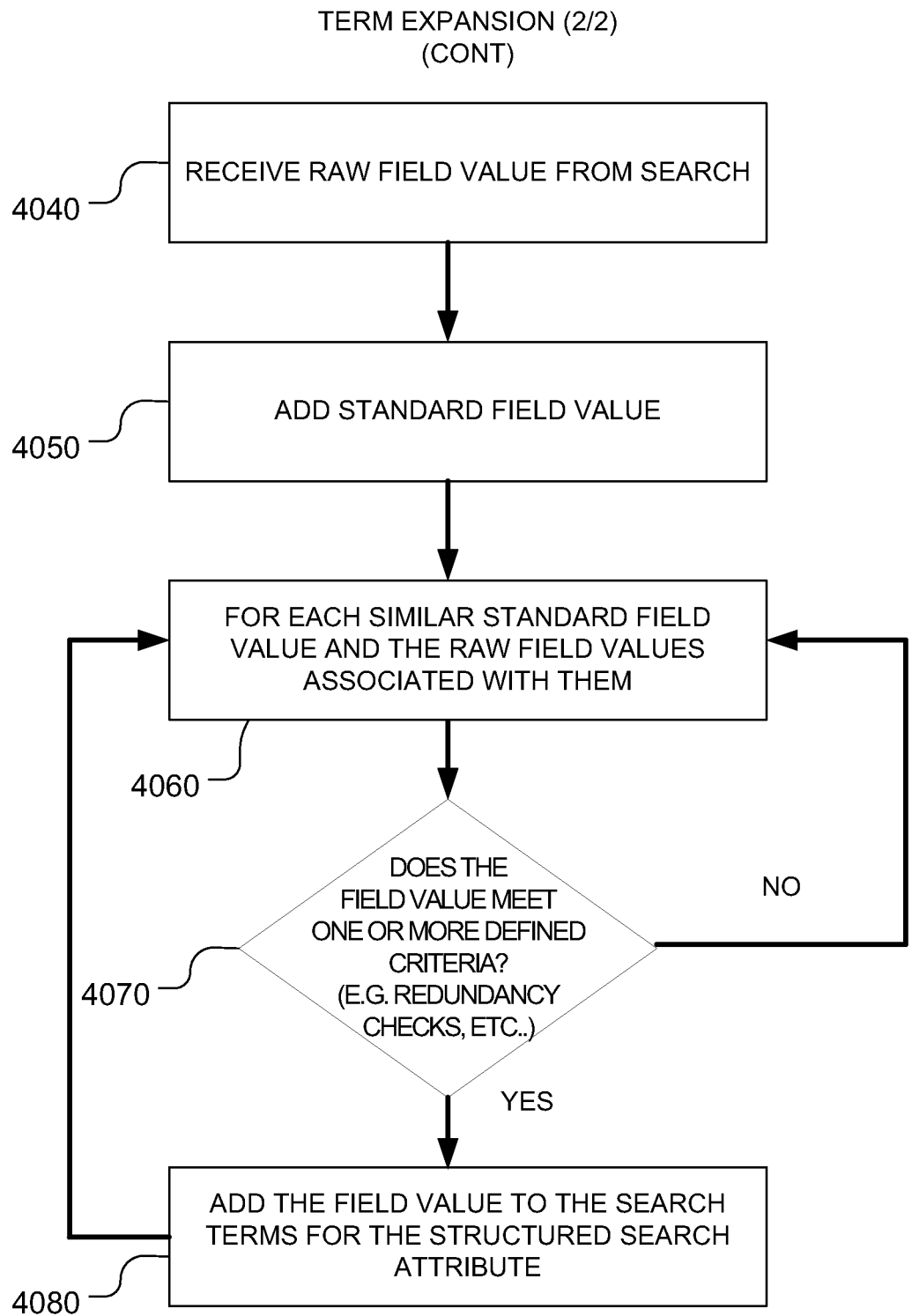
FIG. 4b shows a flowchart of an expansion method according to one example of the present disclosure.

Continuing on to FIG. 4b, at operation 4040, values corresponding to a particular search field may be received. At operation 4050, the standard value mapped to that particular field may be added to the search. Thus for example, if "Computer Programmer" were the parsed field value, any standard value may be added, such as "Software Engineer." In some examples, these additional terms may be separated by certain Boolean logic operators, such as the "OR" operator, or the like.

At operations 4060-4080, additional search terms may be added based upon similar standard fields. The similar standard fields to be added are determined based upon the TFIDF scores. In some examples, in order to be considered similar, the TFIDF score must be above a specific absolute threshold, or above a relative threshold based on the TFIDF score of the most similar standard field or fields. In some examples, only the standard fields most similar to the standard field (e.g. the top 3 or the like) corresponding to the raw value in the query may be considered to be similar. In other examples, similarity scores may be computed using other metrics such as Jaccard coefficient or mutual information. If another standard field is similar enough to the standard field associated with the raw field in the query to meet the similarity criteria, that other similar standard field value and each raw field value linked to that similar standard field value are examined individually to determine if each term meets one or more other defined criteria at operation 4070. If the other defined criteria are met, at operation 4080 the term may be added to the search.

In some examples the defined criteria used in operation 4070 may include avoiding the inclusion of similar terms that contain a subset or superset of the words in the original term to avoid redundancy. In other examples, the criteria may attempt to make sure that similar terms that are added are likely to increase search results by ensuring that the similar term is well represented in the structured data. For example, one criterion might be that the number of job titles in member profiles with the similar job title must be at least 10% of the number of job titles in member profiles with the original standard title. In other examples, certain other criteria must be met such as requiring a similar job title to be of the same job function and seniority level as the original standard title.

In some examples, for locations, the raw locations may be mapped to a geographic region, such as a zip code, city, metropolitan area, state, or country. In some examples, the exact zip code or zip codes of the location may be used, but in other examples all zip codes within a predefined or user defined radius may be included. These zip codes may be defined in a file that maps location names to zip codes. The surrounding zip codes may be determined based upon a zip code map.

Once the search fields are expanded, the search is run and the results are returned. The output is displayed, along with the advanced search form fields, which may be filled in with the parsed fields and the expanded terms. The user may then edit these fields and run a new search.

Figure 5:
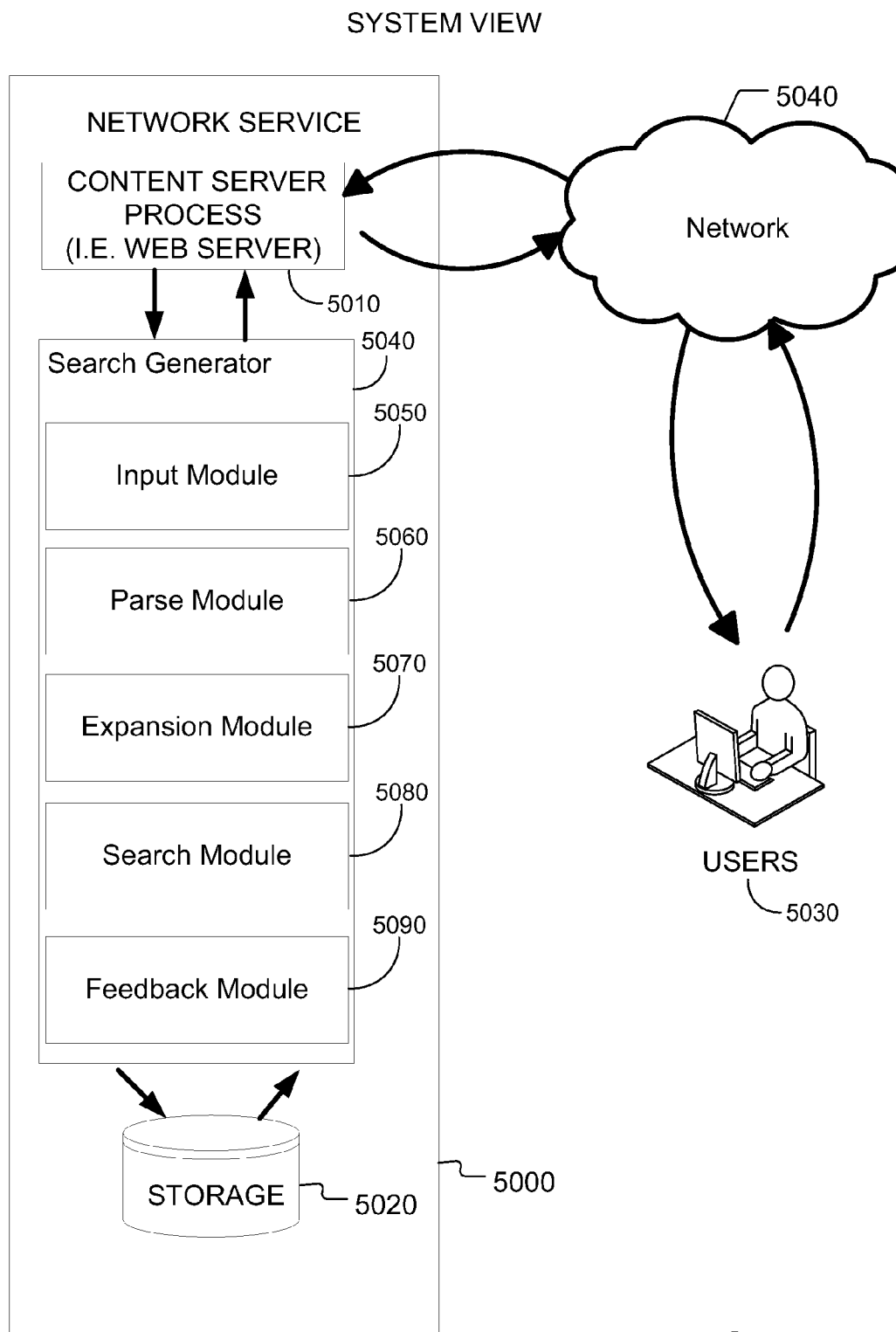
FIG. 5 shows a system diagram according to one example of the present disclosure.

FIG. 5 shows an example network service 5000 according to one example of the current disclosure. In some examples, network service 5000 may be a social networking service, an online job posting service, or the like. Network service 5000 may contain a content server process 5010. Content server process 5010 may communicate with storage 5020 and users 5030 through a network 5040. Content server process 5010 may be responsible for the retrieval, presentation, and maintenance of member profiles, job listings, resume listings, and the like which may be stored in storage 5020. Content server process 5010 in one example may include or be a web server that fetches or creates internet web pages, which may include portions of, or all of, a data record from storage 5020 such as a member profile, a job posting, a resume, or the like at the request of users 5030.

Users 5030 may be an individual, group, or other member, prospective member, or other user of the network service 5000. Users 5030 access social networking service 5000 using a computer system through a network. The network may be any means of enabling the social networking service 5000 to communicate data with a computer remotely, such as the internet, an extranet, a LAN, WAN, wireless, wired, or the like, or any combination.

Search generator 5040 may be any component that allows users 5030 to search storage 5020. In some examples search generator may include an input module 5050. The input module 5050 receives the search string from users 5030 as well as any modifications to the search, including modifications to the parse or expansion processes. In some examples, search generator may also include a parse module 5060 which may take an inputted unstructured search query and calculate a structure to the unstructured search query by parsing the query into one or more structured search fields. In some examples, search generator 5040 may also contain a search expansion module 5070 that expands the parsed query by adding additional or similar terms if certain criteria have been met.

The search module 5080 may then search the storage using the parsed and expanded query according to a variety of search algorithms.

Search generator 5040 may also have a feedback module 5090 that may analyze the performance of the parse and expansion modules by analyzing the various feedback indicators. The feedback module may then adjust the parse or expansion modules in response to this feedback.

FIG. 6 shows one example screen shot of the results of a search for "engineering manager google new york." The advanced search box shows the parsed search title as "engineering manager," with an expanded term. The company name has been filled in with "google," and the postal code corresponding to New York ("10021") has been entered. Additionally a list of results displays.

Figure 7:
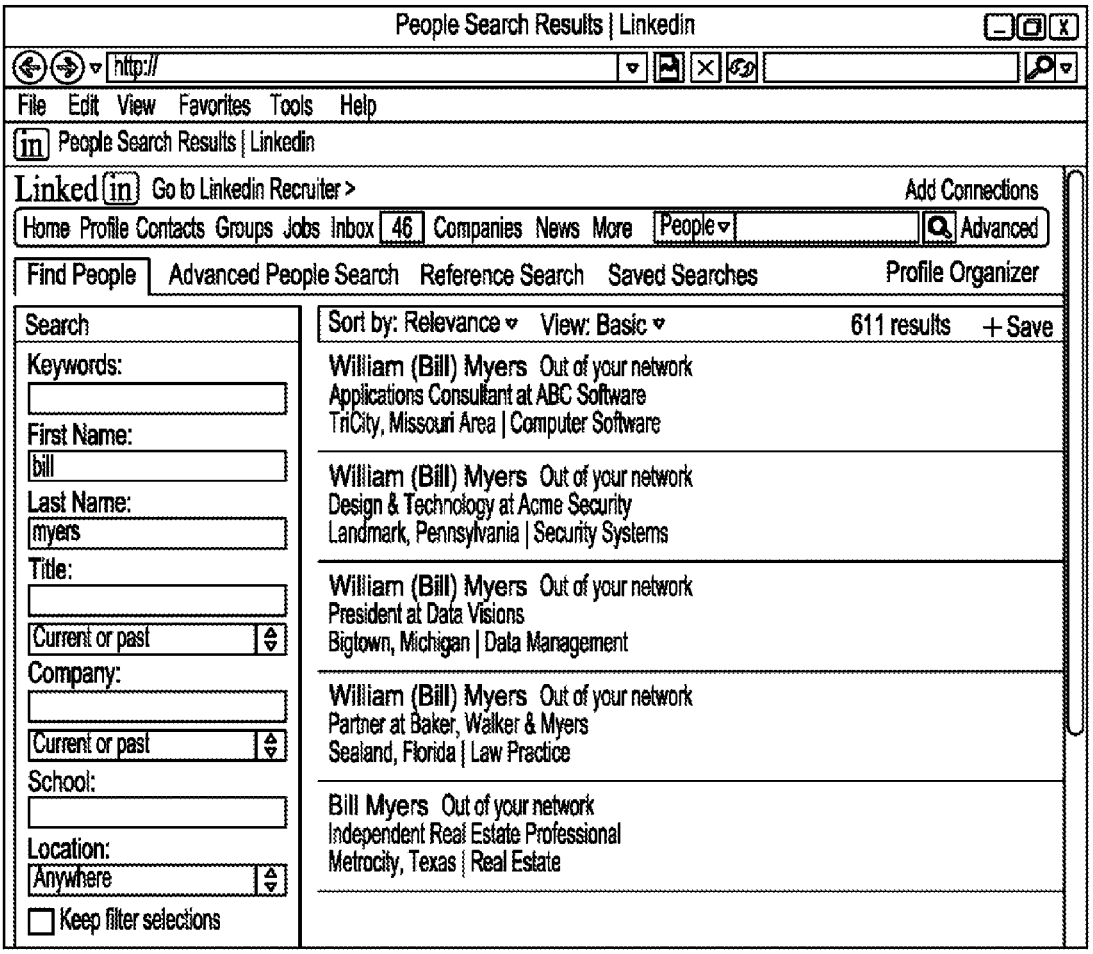
FIG. 7 shows a screenshot according to one example of the present disclosure.

FIG. 7 shows another example screen shot of the results of a search for "bill myers." The advanced search box shows the parsed name as First Name: "Bill", last name: "Myers." Additionally a list of results displays.

Figure 8:
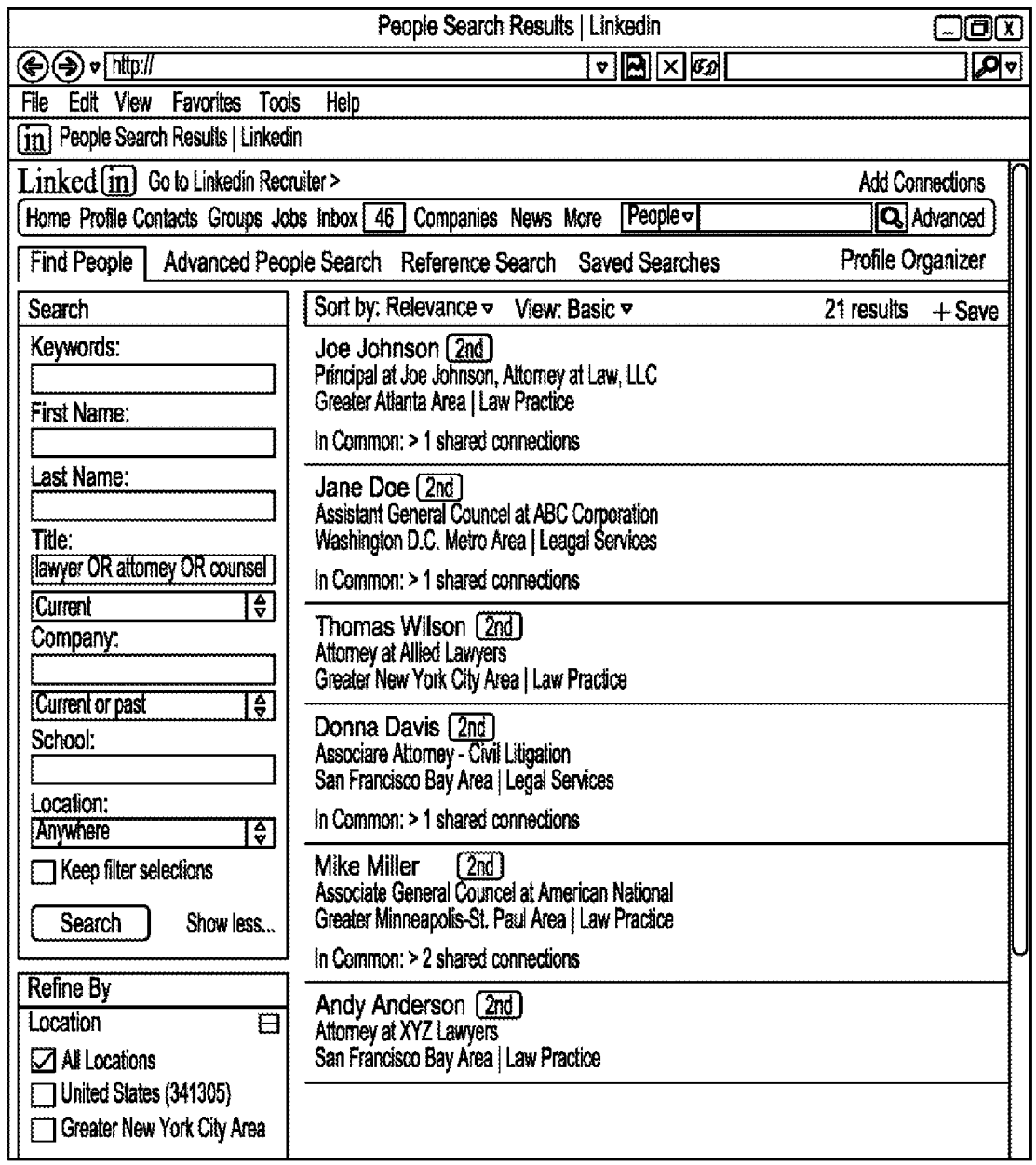
FIG. 8 shows a screenshot according to one example of the present disclosure.

FIG. 8 shows yet another example screen shot of the results of a search for "lawyer." The title field is populated with "lawyer" and the related titles of "attorney" and "counsel." Additionally a list of results is shown.

Many of the examples described herein are provided in the context of a social or business networking website or service. However, the applicability of the inventive subject matter is not limited to a social or business networking service.

A social networking service may be a computer or web-based application that enables users to establish links or connections with persons for the purpose of sharing information with one another. Some social networks aim to enable friends and family to communicate with one another, while others are specifically directed to business users with a goal of enabling the sharing of business information.

A social networking service may be an online service, platform or site that allows members to build or reflect social networks or social relations among members. Typically, members construct profiles, which may include personal information such as name, contact information, employment information, photographs, personal messages, status information, links to web-related content, blogs, and so on. Typically, only a portion of a members profile may be viewed by the general public, and/or other members.

The social networking site may allow members to identify, and establish links or connections with other members in order to build or reflect social networks or social relations among members. For instance, in the context of a business networking service, a person may establish a link or connection with his or her business contacts, including work colleagues, clients, customers, and so on. With a social networking service, a person may establish links or connections with his or her friends and family. A connection is generally formed using an invitation process in which one member "invites" a second member to form a link. The second member than has the option of accepting or declining the invitation.

In general, a connection or link represents or is otherwise associated with an information access privilege, such that a first person who has established a connection with a second person is, via the establishment of that connection, authorizing the second person to view or access non-publicly available portions of their profiles. Of course, depending on the particular implementation of the business/social networking service, the nature and type of the information that may be shared, as well as the granularity with which the access privileges may be defined to protect certain types of data may vary greatly.

Modules, Components, and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Implementation

Figure 9:
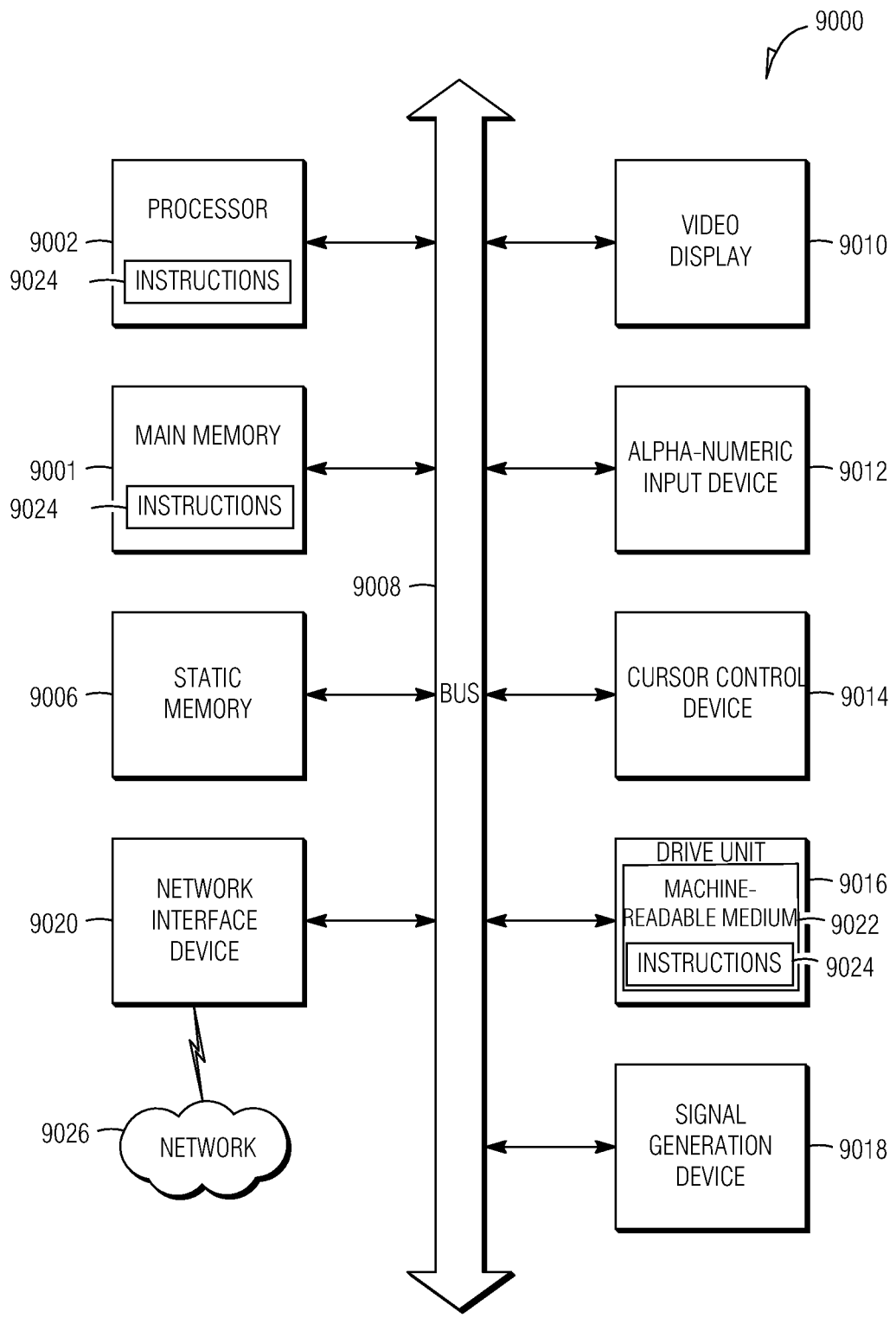
FIG. 9 shows a schematic of a machine implementation according to one example of the present disclosure.

FIG. 9 shows a diagrammatic representation of a machine in the example form of a computer system 9000 within which a set of instructions for causing the machine to perform any one or more of the methods, processes, operations, or methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a tablet PC, a Set-Top Box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments may also be practiced in distributed system environments where local and remote computer systems which are linked (e.g., either by hardwired, wireless, or a combination of hardwired and wireless connections) through a network both perform tasks. In a distributed system environment, program modules may be located in both local and remote memory-storage devices (see below).

The example computer system 9000 includes a processor 9002 (e.g., a Central Processing Unit (CPU), a Graphics Processing Unit (GPU) or both), a main memory 9001 and a static memory 9006, which communicate with each other via a bus 9008. The computer system 9000 may further include a video display unit 9010 (e.g., a Liquid Crystal Display (LCD) or a Cathode Ray Tube (CRT)). The computer system 9000 may also include an alphanumeric input device 9012 (e.g., a keyboard), a User Interface (UI) cursor controller 9014 (e.g., a mouse), a disk drive unit 9016, a signal generation device 9018 (e.g., a speaker) and a network interface device 9020 (e.g., a transmitter). In other examples, the machine may include a touch-sensitive display.

The disk drive unit 9016 includes a machine-readable medium 9022 on which is stored one or more sets of instructions 9024 and data structures (e.g., software) embodying or used by any one or more of the methodologies or functions illustrated herein. The software may also reside, completely or at least partially, within the main memory 9001 and/or within the processor 9002 during execution thereof by the computer system 9000, the main memory 9001 and the processor 9002 also constituting machine-readable media.

The instructions 9024 may further be transmitted or received over a network 9026 via the network interface device 9020 using any one of a number of well-known transfer protocols (e.g., HTTP, Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories, and optical and magnetic media.

Method embodiments illustrated herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, Random Access Memories (RAMs), Read Only Memories (ROMs), and the like.

Additional Notes

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description.

The Abstract is provided to comply with 37 C.F.R. §1.72(b), to allow the reader to quickly ascertain the nature of the technical disclosure. It is submitted with the understanding that it will not be used to interpret or limit the scope or meaning of the claims.

Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

What is claimed is:

1. A method comprising:
receiving a raw search field value;
determining a standardized search field from a plurality of standardized search fields for the raw search field value;
mapping the raw search field value to a standard field value, the standard field value corresponding to the standardized search field;
determining a plurality of similarity scores between the standard field value and a plurality of other standard field values based upon a cosine similarity using field values associated with member profiles;
using the plurality of similarity scores, selecting a second standard field value;
performing a search using the raw search field value, the standard field value, and the second standard field value to identify a plurality of search results;
displaying the plurality of search results.

2. The method of claim 1, wherein selecting the second standard field value includes determining that a similarity score between the standard field value the second standard field value exceeds a threshold.

3. The method of claim 1, wherein selecting the second standard field value includes determining that a similarity score between the standard field value the second standard field value exceeds all other similarity scores in the plurality of similarity scores.

4. The method of claim 1, wherein performing the search includes performing the search on a structured database.

5. The method of claim 4, wherein the structured database includes the plurality of standardized search fields, and performing the search on the structured database includes performing the search on the standardized search field.

6. The method of claim 1, further comprising:
receiving a user edit to the search, the user edit removing at least one of the standard field value, the second standard field value, and raw search field value; and
performing a new search based on the user edit.

7. The method of claim 1, further comprising populating a search form with the standard field value and the second standard field value in a representation of the standardized search field.

8. The method of claim 7, wherein displaying the plurality of search results includes displaying the search form.

9. The method of claim 7, wherein populating the search form includes populating the search form with the raw search field value.

10. A machine readable medium not having any transitory signals and comprising instructions that, when executed by at least one processor of a machine, cause the machine to perform operations to:
receive a raw search field value;
determine a standardized search field from a plurality of standardized search fields for the raw search field value;
map the raw search field value to a standard field value, the standard field value corresponding to the standardized search field;
determine a plurality of similarity scores between the standard field value and a plurality of other standard field values based upon a cosine similarity using field values associated with member profiles;
using the plurality of similarity scores, select a second standard field value;
perform a search using the raw search field value, the standard field value, and the second standard field value to identify a plurality of search results;
display the plurality of search results.

11. The machine readable medium of claim 10, wherein operations to select the second standard field value include operations to determine that a similarity score between the standard field value the second standard field value exceeds a threshold.

12. The machine readable medium of claim 10, wherein operations to select the second standard field value include operations to determine that a similarity score between the standard field value the second standard field value exceeds all other similarity scores in the plurality of similarity scores.

13. The machine readable medium of claim 10, further comprising operations to populate a search form with the standard field value and the second standard field value in a representation of the standardized search field.

14. The machine readable medium of claim 13, wherein operation to display the plurality of search results include operations to display the search form.

15. The machine readable medium of claim 13, wherein operations to populate the search form include operations to populate the search form with the raw search field value.

16. A system comprising:
one or more processors coupled to a memory device, the memory device containing instructions that, when executed by the one or more processors, cause the system to:
receive a raw search field value;
determine a standardized search field from a plurality of standardized search fields for the raw search field value;
map the raw search field value to a standard field value, the standard field value corresponding to the standardized search field;
determine a plurality of similarity scores between the standard field value and a plurality of other standard field values based upon a cosine similarity using field values associated with member profiles;
using the plurality of similarity scores, select a second standard field value;
perform a search using the raw search field value, the standard field value, and the second standard field value to identify a plurality of search results;
display the plurality of search results.

17. The system of claim 16, wherein operations to select the second standard field value include operations to determine that a similarity score between the standard field value the second standard field value exceeds a threshold.

18. The system of claim 16, wherein operations to select the second standard field value include operations to determine that a similarity score between the standard field value the second standard field value exceeds all other similarity scores in the plurality of similarity scores.

19. The system of claim 16, wherein operations to perform the search include operations to perform the search on the standardized search field in a structured database, the structured database including the plurality of standardized search fields.

20. The system of claim 19, wherein the instructions further cause the system to:
  receive a user edit to the search, the user edit removing at least one of the standard field value, the second standard field value, and raw search field value; and
  perform a new search based on the user edit.

\* \* \* \* \*

UNITED STATES PATENT AND TRADEMARK OFFICE
CERTIFICATE OF CORRECTION

PATENT NO. : 9,710,518 B2
APPLICATION NO. : 14/802466
DATED : July 18, 2017
INVENTOR(S) : Cheng et al.

Page 1 of 1

It is certified that error appears in the above-identified patent and that said Letters Patent is hereby corrected as shown below:

In the Claims

In Column 18, Line 37, in Claim 14, delete "operation" and insert --operations-- therefor Signed and Sealed this
Twenty-eighth Day of April, 2020

Andrei Iancu
*Director of the United States Patent and Trademark Office*